United States Patent [19]

MacPhail

[11] Patent Number: 4,899,299
[45] Date of Patent: Feb. 6, 1990

[54] METHOD FOR MANAGING THE RETENTION OF ELECTRONIC DOCUMENTS IN AN INTERACTIVE INFORMATION HANDLING SYSTEM

[75] Inventor: Margaret G. MacPhail, Austin, Tex.

[73] Assignee: International Business Machines Corporation, Armonk, N.Y.

[21] Appl. No.: 138,231

[22] Filed: Dec. 23, 1987

[51] Int. Cl.[4] .............................................. G60K 15/00
[52] U.S. Cl. ..................................... 364/570; 364/401; 364/518
[58] Field of Search ............... 364/408, 570, 401, 403, 364/406, 407, 518, 200, 300, 900; 340/825.06, 706

[56] References Cited

U.S. PATENT DOCUMENTS

| | | | |
|---|---|---|---|
| 4,626,836 | 12/1986 | Curtis et al. | 340/700 |
| 4,648,061 | 3/1987 | Foster | 340/825.06 |
| 4,730,252 | 3/1988 | Bradshaw | 364/403 |
| 4,791,281 | 12/1988 | Johnsen et al. | 364/401 |
| 4,807,154 | 2/1989 | Scully et al. | 364/518 |
| 4,807,155 | 2/1989 | Cree et al. | 364/518 |
| 4,817,018 | 3/1989 | Cree et al. | 364/518 |
| 4,819,191 | 4/1989 | Scully et al. | 364/518 |

Primary Examiner—Parshotam S. Lall
Assistant Examiner—Christopher L. Makay
Attorney, Agent, or Firm—Richard E. Cummins

[57] ABSTRACT

A method of managing the retention and deletion of electronic documents in which the respective document retention needs of the document owners and the document retention criteria of the enterprise that functions as the central administration of the system are achieved without compromise by establishing a dual label for each document that is to be stored in the system and allowing a different expiration date to be entered into the system for each label. The first label is referred to as the Document Label (DL) and functions to identify the business use classification of the document. The second label is referred to as the Ownership Label (OL) and functions to identify a document classification assigned by the owner, which in most situations is the author. The separate expiration dates associated with each of the labels are referred to as the Ownership expiration date and the Document expiration date. The ownership expiration date is set by the owner to indicate the length of time that he desires ownership of the document. Ownership implies the authority and responsibility for the document during the ownership period. A System Administrator (SA) for example establishes the document expiration date. Each document filed in the system has associated with it the label and expiration date criteria that are employed to automatically manage the retention and deletion of the electronic documents stored by the system in accordance with some simple algorithm that allows a document to be deleted only when a particular relationship exists among a current date and the two expiration dates.

10 Claims, 5 Drawing Sheets

| SUB-ACTION MENU FOR A DOCUMENT |
|---|
|       COPY<br>      UPDATE CONTENT<br>x    SET DESCRIPTORS<br>      FILE<br>      MAIL<br>      DELETE |

FIG. 4b

| SELECT ACTION FOR DOCUMENT |
|---|
|       COPY<br>      UPDATE CONTENT<br>      SET DESCRIPTORS<br>x    FILE<br>      MAIL<br>      DELETE |

FIG. 4c

| SET DESCRIPTORS FOR DOCUMENT |
|---|
| DOCUMENT NAME:<br><br>SUBJECT:<br><br>DOCUMENT LABEL: MEMO<br><br>DOCUMENT EXPIRATION DATE: 12/10/87<br><br>OWNERSHIP LABEL: <u>PERSONAL MEMO</u><br><br>OWNERSHIP EXPIRATION DATE: 10/10/87<br><br>NOTE:<br>    TO SEE A LIST OF ALLOWABLE VALUES, PLACE THE CURSOR UNDER<br>    THE FIELD AND PRESS HELP<br><br><br>TO EXIT THIS MENU, PRESS ENTER. |

FIG. 5

METHOD FOR MANAGING THE RETENTION OF ELECTRONIC DOCUMENTS IN AN INTERACTIVE INFORMATION HANDLING SYSTEM

FIELD OF INVENTION

This invention relates in general to storage of electronic documents in an interactive information handling system and in particular to a method of automatically managing the retention and deletion of documents stored in the system.

BACKGROUND ART

The prior art has disclosed various interactive information handling systems which store electronic documents. These systems vary in complexity and sophistication from the very simple personal computer employed in the home for writing letters to the very large main frame data processing systems in which thousands of users nodes interact with each other and with a centralized library or file of information. An example of a sophisticated system that is currently in use by several large governmental agencies and private corporations is the system referred to as PROFS that is marketed by the IBM Corporation. These types of system store and manage millions of documents ranging from one page memos and messages to multi-page reports that might involve several printed volumes. In many of these systems, the need for hard copy no longer exists, so the only copy of the information is the originally generated electronic copy.

The management and control of the paper flow in any large enterprise, be it a governmental agency or a private corporation, requires a set of procedures which define how various types of communications or documents are to be handled. This is a necessity in both manually implemented systems which deal in nothing but hard copy as well as electronically implemented systems that deal only with electronic copies. It is generally recognized by both types of systems, that there are two basic document control strategies that must be enforced in order to have an effective and efficient system. The first is that documents that are no longer needed should be deleted from the system as soon as possible and the second is that a document that is required should be maintained as long as it is needed by the document owner or the enterprise.

It is obvious that in implementing these two basic concepts it is not always possible to obtain an agreement, much less a consensus, on such items as to who makes the decision to keep or delete a document, does this decision apply to all documents types or does it change with the type of document, can there be exceptions and changes in the criteria, who determines the time period for document types, etc.

The prior art systems that involve a large number of users who create electronic documents that are stored in the system at a logically centralized location, do generally impose a number of structured formatting constraints on the manner by which documents are identified in the system. In most systems, some type of manual document classification system is established, either on a formal basis or a de facto basis. A bank might use a functional business classification for documents. For example a customer's loan folder might include a "load application", a "credit history", a "payment history" etc. These various documents have different storage requirements and there is generally no provision made to permit any deviations from the established retention criteria. In prior art systems a search is performed for a term in a plurality of documents and documents are deleted based thereon. This form of document management may result in the deletion of documents which should be retained. The search term may have a different meaning within the various documents. Thus, the deletion will result in errors and possible omissions is a document which should be deleted does not contain the searac term.

A batch type of approach to document retention where the date to delete the document is controlled by the enterprise creates a problem when the date has to be changed. If the date is shortened, there is undoubtedly some persons who are relying on the fact that the document is to be available up to the previously established date. How does the system administrator evaluate whether these documents can be destroyed. If the documents are deleted there is some direct consequence to those persons who were relying on the document for their work. The more serious consequence however, is a loss of integrity of the system which soon results in users operating their own backup document storage system.

The present invention is directed to an improved method for use in an interactive information handling system in which the retention and deletion of documents is managed in a manner to avoid problems of the prior art document storage systems. The method allows the business use of a document by an owner of the document to be tied to the document retention and ownership retention.

SUMMARY OF THE INVENTION

The method of the present invention involves a recognition of the respective document retention needs of the document owners and the document retention criteria of the enterprise that functions as the central administration of the system, by establishing a dual label for each document that is to be stored in the system. The first label is referred to as the Document Label (DL) and functions to identify the business use classification of the document. The second label is referred to as the Ownership Label (OL) and functions to identify a document classification assigned by the owner.

An separate expiration date is associated with each of the two labels. The ownership expiration date is set by the owner to indicate the length of time that the owner desires ownership of the document. Ownership implies the authority and responsibility for the document during the ownership period. A System Administrator (SA) for example establishes the allowable retention periods for each of the document labels. Each document filed in the system has associated with it the label and expiration date criteria that are employed to automatically manage the retention and deletion of documents from the system.

When a document is to be filed by the system, the retention and deletion selection criteria are entered into the system and stored in the system at the same time as the document. The information is entered into the system interactively by the end user by following a series of prompts presented on the screen of a display device by the system in response to the user having selected an option presented on a menu screen. Valid document labels are preferably preestablished so that the user selects a particular document label from an established and approved list. The default expiration date for that document label has been previously established by the enterprise and is preferably entered automatically. The end user may override the default with a valid expiration date.

Valid ownership labels are also preferably preestablished by the document owner and are approved by the enterprise. The document owner can establish a default expiration date for each ownership label which can be entered automatically when the ownership label is entered. The end user may override the default with a valid expiration date. The ownership expiration date and the document expiration date may be tied together with a rule that interrelates the dates. For example, for a given document label, the dates must be equal.

Documents are automatically retained and deleted by processing the expiration date criteria associated with each document relative to a current date according to the following date relationships.

If the current date is less than both expiration dates, retain the document.

If the current date is greater than both expiration dates, delete the document.

If the current date is greater than the ownership expiration date but less than the enterprise expiration date, retain the document and transfer ownership to the designated user or the system administrator based on a preset list by ownership label by user.

If the current date is greater than the enterprise expiration date but less than the ownership expiration date, retain the document.

It is therefore an object of the present invention to provide an improved method for storing electronic documents.

Another object of the present invention is to provide an improved method for managing the retention of stored electronic documents in an information handling system.

A further object of the present invention is to provide an improved method for managing the retention of stored electronic documents in which documents are retained in accordance with criteria established by the end user during the period the end user is the document owner.

A still further object of the present invention is to provide an improved method to automatically delete stored electronic documents when criteria set by the end user indicates that ownership of the document has been relinquished.

Object and advantages other than those mentioned above will become apparent from the following description when read in connection with the drawing

BRIEF DESCRIPTION OF THE DRAWING

FIGS. 4a, 4b and 4c illustrate screens for the main action menu, the sub-action menu for a document, and the select action for document menu, referred to in FIG. 3b.

FIG. 5 is a screen which prompts an end user involved in the step of entering the retention and deletion criteria for each document into the system.

DESCRIPTION OF THE PREFERRED EMBODIMENT

Figure 1:
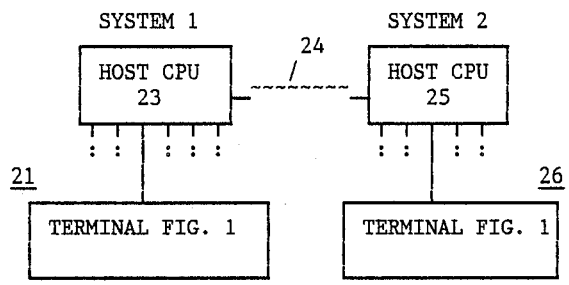
FIG. 1 is a block diagram of an information handling system in which the method of the present invention may be advantageously employed.
Figure 2:
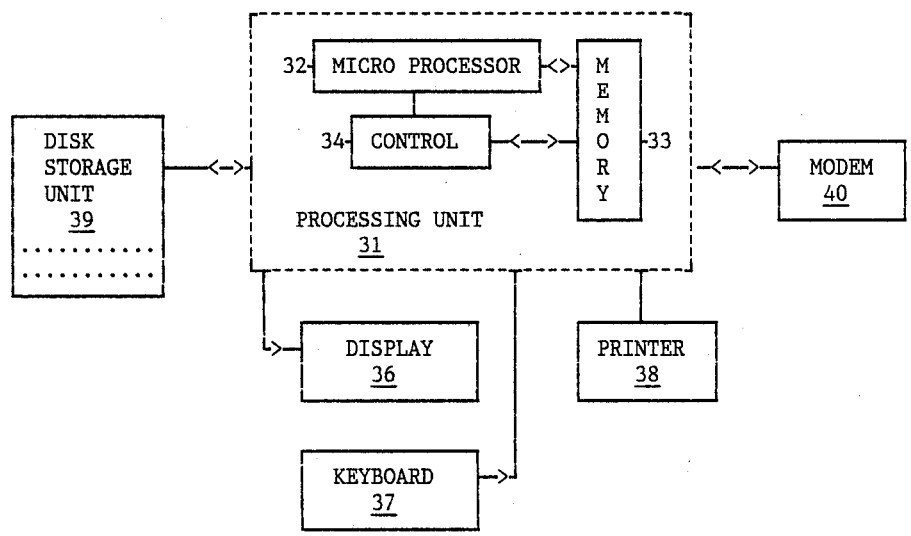
FIG. 2 is a block diagram of one of the interactive terminals employed by a user in the system of FIG. 1.

FIG. 1 illustrates an information handling system comprising network of interactive type terminals of workstations of the type shown in detail in FIG. 2. As illustrated, the network includes a plurality of terminals which are interconnected with each other and to a host central processing unit 23. As shown in FIG. 1 host 23 in turn is connected via communication link 24 to a second host processing unit 25, which also connects to another network 26 of interactive workstations. Functionally, the system operates to allow each terminal to communicate with the host and to one or more other terminals using established communication protocols, so that the various serially connected communication links are transparent to the users. A user at one terminal can generate a document such as a letter and send that letter to the addressee at a designated node on the network. The user can then store the document in the system at some logically central system location. Each user of the system has the theoretical capability of retrieving that document at a later time. Such systems are well known in the art, and are currently in extensive commercial use. Since the general organization and operations of such systems is well known, only those details that are necessary for an understanding of the document storage method of the present invention will be described. It should therefore be assumed in the following description, that each workstation on the network has a system node address and a "post office" address, and that to simplify the description, there is only one individual assigned to each node on the network. It should further be assumed that conventional communication services are provided by the system, such as directory listings of individual users or owners etc. It may also be assumed that the system shown in FIG. 1 processes information as various types of data objects such as text data objects, graphic data objects, and calendar data objects etc..

FIG. 2 illustrates the functional components of one of the interactive type data processing terminals shown in FIG. 1. The terminal comprises a processing unit 31 which includes a microprocessor block 32, a semiconductor memory 33, and a control block 34 which functions to control input/outut operations in addition to the interaction between the micro processor block 32 and the memory unit 33.

The terminal further includes a group of conventional peripheral units including a display device 36, a keyboard 37, a printer 38, a disk storage unit 39, and a modem 40. Since the details of the above described functional blocks form no part of the present invention and can be found in the prior art, only a brief functional description of each block is set forth, along with a description of their interactions, sufficient to provide a person of ordinary skill in the art with a basis of understanding applicants' improved electronic document storage method.

Processing unit 31 corresponds for example to the "system unit" of a personal computer system such as the IBM XT, IBM AT or an IBM PS/2 system. Unit 31 is provided with an operating system program which may be one of the many versions of DOS (Disk Operating System) which is normally employed to run the systems. The operating system program is stored in memory 33 along with one or more application programs that the user has selected to run. Depending on the capacity of memory 33 and the size of the application programs, portions of these programs, as needed, may be transferred to memory 33 from the disk storage unit 39 which may include, for example, a 30 megabyte hard disk drive and a diskette drive. The basic function of the disk storage unit is to store programs and data that are employed by the system and which may readily be transferred to the memory unit 33 when needed. The function of the diskette drive is to provide a removable storage function for entering programs and data into the system, and a vehicle for storing data in a form that is readily transportable for use on other terminals or systems.

Display device 36 and keyboard 37 together provide for the interactive nature of the terminal, in that in normal operation, the interpretation that the system gives to a specific keystroke by the operator depends, in substantially all situations, on what is being displayed to the operator at that point in time.

In some situations, the operator, by entering commands into the system, causes the system to perform a certain function. In other situations, the system requests the entry of certain data, generally by displaying a prompt type of menu/message screen. The depth of the interaction between the operator and the system varies by the type of operating system and the application program, but is a necessary characteristic of terminals on which the method of the present invention may be employed.

The terminal shown in FIG. 2 further includes a printer 38, which functions to provide hard copy output of data developed or stored in the system at some central location. Lastly, the modem 40 functions to transfer data from the terminal of FIG. 2 to a host system through one or more communication links which may be a commercial type link or a dedicated communication link.

Figure 3A:
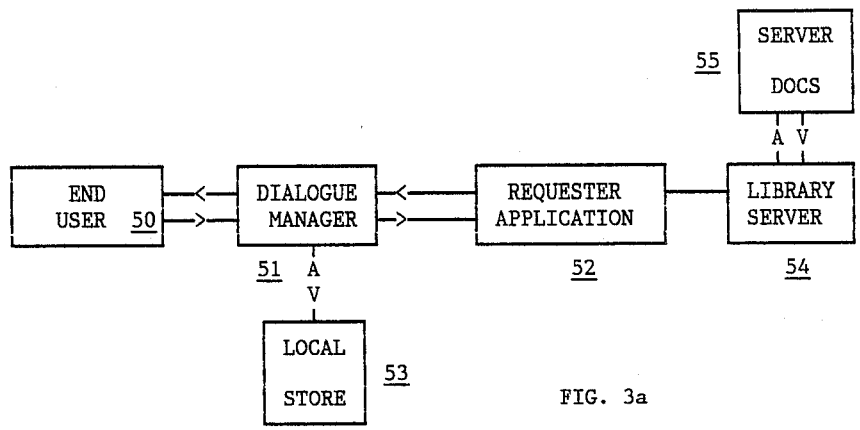
FIGS. 3a and 3b illustrate an overview of the document generation and storage process.
Figure 3B:
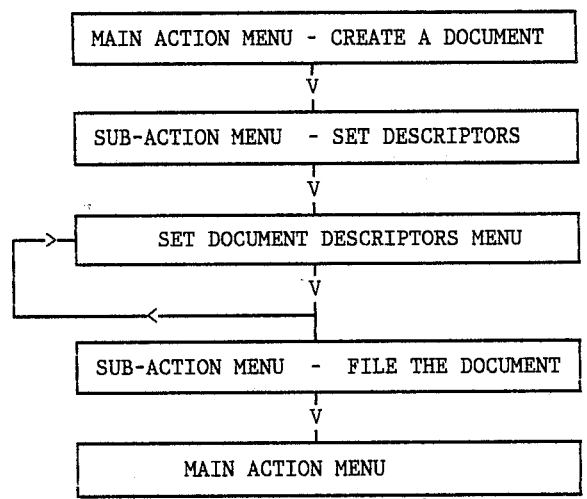

FIG. 3a represents an overview of the system from the standpoint of the major interactive steps involved in storing a document that has been created by an End User (EU). Block 50 represents the EU. Blocks 51 and 52 represent programs stored at the terminal while block 53 represents local disk storage. Blocks 54 and 55 represent the library server function located at the host and is the central depository for stored system documents. The program represented by block 51 is referred to as the Dialogue Manager application and functions to provide the necessary menus and prompts to obtain information from the user. It is essentially the interface to the user from the terminal. The program represented by block 52 is referred to as the requester application and functions to build requests and send them to the library server. The function of the library server is to validate/set labels and expiration dates and to file the document. The flow chart of FIG. 3b shows the major steps of first creating a document; second selecting the sub-action menu in order to set the document descriptors; thirdly setting the actual descriptors in the set document descriptor menu; and lastly filing the document.

Figure 4A:
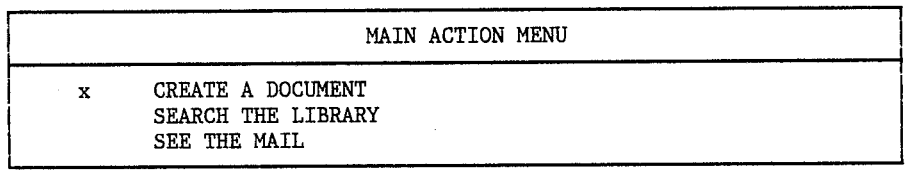

The main action menu is shown in FIG. 4a. As shown, the menu illustrates three separate actions that the EU can designate. The screen cursor is represented by an X in FIG. 4a and as illustrated is adjacent the "Create a Document" action. The action is selected in the normal manner by positioning the cursor adjacent the line on the menu and hitting the "enter" key. The system responds with a series of prompts which allows the user to create a document. For purposes of this description it can be assumed that the end user merely stores.

In order to store the document, descriptors must be assigned which assists in controlling the retention of the document up to a specified time and automatic deletion of the document after that time, in accordance with some predetermined strategy. The sub-action menu shown in FIG. 4b. includes an option to "SET DESCRIPTORS" which is selected to enter the criteria that will be used to manage the retention and automatic deletion of documents from the system. When this option is selected the screen shown in FIG. 5 is displayed to the EU. The end user responds to the various prompts displayed in FIG. 5 by entering a name for the document label and a name for the ownership label. It should be assumed for purpose of this discussion that the respective names have been preestablished which is not necessary a requirement of the system, but does simplify the description of the present invention. The expiration dates for the document and the ownership may be provided in a number of different ways. As indicated on the screen of FIG. 5, a list of allowable values can be obtained by placing the cursor under the appropriate field and pressing a predesignated key such as the "HELP" key. The allowable values which have been preestablished then appears in a "window" on a separate screen which permits the user to copy or just select the choice by positioning the cursor and pressing the "ENTER" key. In the alternate a date can be inserted automatically based on the user's name, and the labels which have been entered providing an index into a stored table of approved dates. The document name and subject may be optional entries and not required for the method of the present invention.

After all the data is entered and displayed in the screen of FIG. 5, the end user presses the ENTER key and is returned to the sub-action menu of FIG. 4b. The "FILE" i.e. file document option is selected by positioning the cursor and again pressing the ENTER key. The newly created document along with the labels and expiration dates are then stored in the system by the library server.

The flow chart shown in FIG. 6 illustrates the steps involved by the system in automatically controlling the retention and deletion of documents in the system. The strategy that is implemented recognizes that it is important to insure that documents be removed from the system as soon as possible after they have been deemed no longer useful as indicated by their expiration date. A document that contains outdated information can often be more dangerous than not having a copy of the document. It is also equally as important not to destroy any document before its expiration date as determined by the document owner. The method therefore follows a relatively simple algorithm which compares a current date entered into the system by the system administrator against the ownership expiration date and the document expiration date that was established by the enterprise. The logic of the algorithm is as follows.

If the current date is less than both expiration dates, retain the document.

If the current date is greater than both expiration dates, delete the document.

If the current date is greater than the ownership expiration date but less than the enterprise expiration date, retain the document.

If the current date is greater than the enterprise expiration date but less than the ownership date, retain the document and transfer ownership to either the system administrator or another designated end user.

Figure 6A:
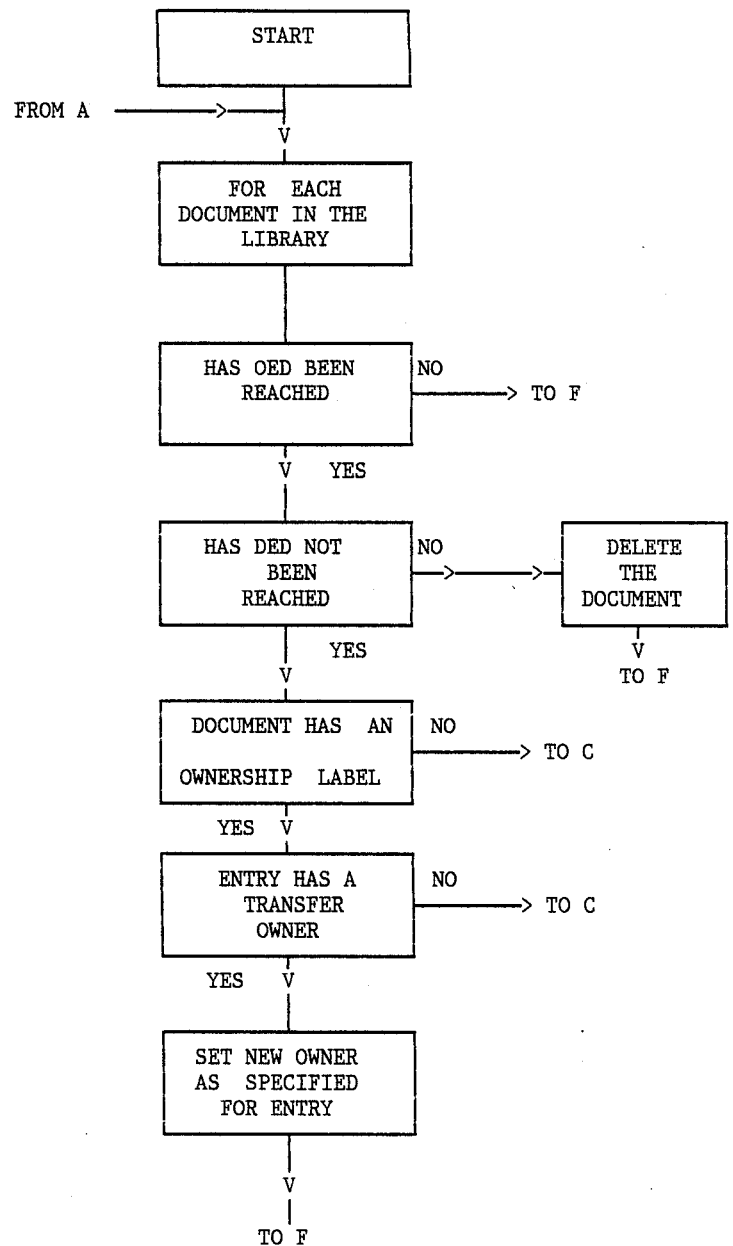
FIGS. 6a and 6b show a flow chart setting forth the steps involved in the automatic deletion of documents from the system shown in FIG. 1.
Figure 6B:
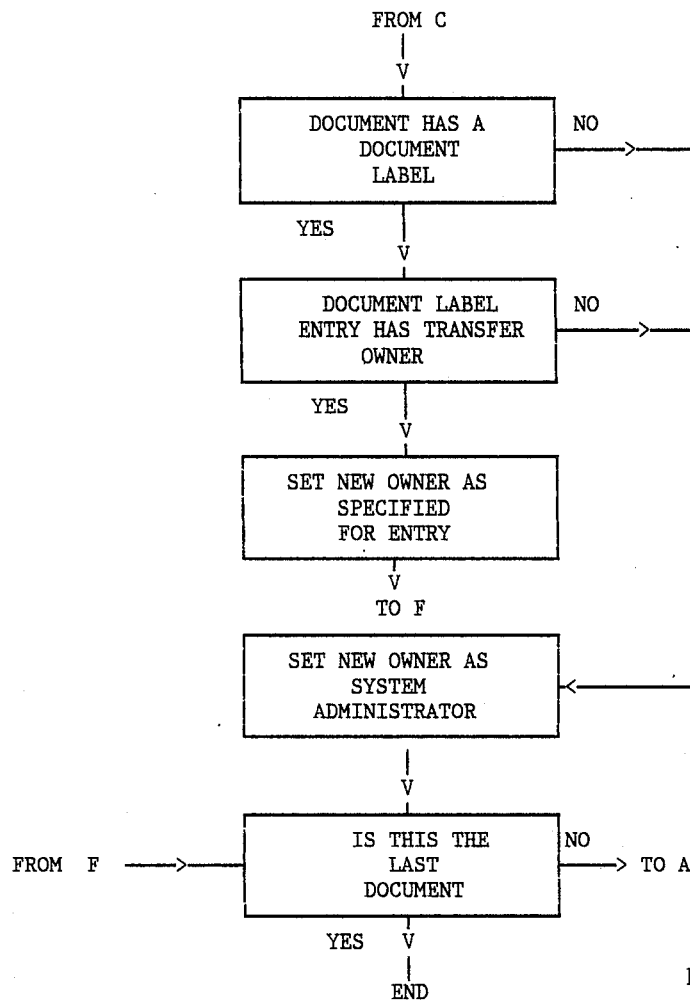

The particular sequence of steps shown in the flow chart of FIGS. 6a and 6b is one implementation of the document retention and deletion strategy that is set forth above. The flow chart is at a level of detail that requires no additional explanation.

While Applicant has disclosed a preferred embodiment of the method, it will be apparent to persons skilled in the art that various changes and modifications may be made without departing from the spirit of the invention and the scope of the appended claims.

I claim:

1. A method for automatically controlling the retention and deletion of a plurality of electronic documents of different types stored in an interactive information handling system by a plurality of end users, each said stored document being assigned to either one of said end users or an administrator of said system to insure that said documents are retained in said system until the latest of two independently established expiration dates, said method comprising the steps of,
   (A) storing in said system in association with each said document, first and second expiration dates which have been selected respectively in accordance with first and second different criteria, said first and second criteria reflecting future retention needs for said type of document respectively of said one of said end users and said administrator,
   (B) periodically logically comparing with said system each said expiration date with a current date to determine if a predetermined relationship exists among said dates for each of said plurality of documents, and
   (C) deleting said associated document only when said step of comparing indicates that said current date is later than both of said expiration dates.

2. The method recited in claim 1 including the further steps of,
   (A) selecting said first expiration date for each said type of document based on said needs of said one end user to access said document, and
   (B) selecting said second expiration date for each said type of document based on said needs of said administrator to retain said type of document.

3. The method recited in claim 2 including the further steps of,
   (A) establishing in said system for each said type of document first and second classification labels, each of which is associated respectively with said first and second expiration dates, and
   (B) assigning said labels to each said document of said type at the time said document is initially stored.

4. The method recited in claim 3 in which said system includes a keyboard and said step of assigning includes the further step of
   (A) interactively entering said first and second labels into said system by said one end user operating said keyboard prior to said document being stored.

5. The method recited in claim 4 in which said system includes a display device and said step of interactively entering includes the further step of,
   (A) displaying on said device with said system a screen of information which prompts said one end user to enter said labels.

6. The method recited in claim 5 including the further step of,
   (A) initially displaying to said one end user, after said one end user has created a document, a menu having a plurality of options to prompt said operator to select one said option to cause said screen of information to be displayed.

7. The method recited in claim 6 in which said step of displaying a screen of information includes,
   (A) displaying a plurality of said first labels and a plurality of said second labels each of which have been previously approved for said system and for said one said owner.

8. The method recited in claim 1 in which said step of logically comparing includes the further step of,
   (A) assigning said associated said document to said administrator automatically with said system when said current date equals said first said expiration date.

9. The method recited in claim 8 in which said step of logically comparing includes the further step of,
   (A) providing an indication to said system when said current date is later than both said expiration dates to cause said system to delete said associated document.

10. A method of managing retention and deletion of electronic documents in a computer system having a plurality of different types of stored documents and a plurality of end users, said method comprising the following combination of sequential steps,
    (A) establishing a set of document descriptors for said stored documents including a plurality of default document expiration dates, each of which is assigned to one of said document types to cause each said document of said one said type that is not owned by one of said end users to be automatically deleted from said system after said default document expiration date, and a plurality of document ownership dates each of which is assignable to one said document by one of said end users,
    (B) assigning with said system one of said document ownership dates to a selected one of said stored documents based on said document descriptors, and
    (C) assigning the ownership of said selected document to said end user who assigned said document ownership date to said document, to insure said selected document is retained in said system until said assigned document ownership date.

* * * * *